United States Patent
Watson et al.

(10) Patent No.: US 8,612,597 B2
(45) Date of Patent: Dec. 17, 2013

(54) COMPUTING SCHEDULING USING RESOURCE LEND AND BORROW

(75) Inventors: Colin Watson, Kirkland, WA (US); Konstantinos Kollias, Stanford, CA (US); Christopher J. Crall, Seattle, WA (US); Sayantan Chakravorty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 12/962,541

(22) Filed: Dec. 7, 2010

(65) Prior Publication Data

US 2012/0144039 A1 Jun. 7, 2012

(51) Int. Cl.
*G06F 15/173* (2006.01)

(52) U.S. Cl.
USPC ............ 709/226; 709/228; 709/229; 709/232

(58) Field of Classification Search
None
See application file for complete search history.

(56) References Cited

U.S. PATENT DOCUMENTS

| | | | |
|---|---|---|---|
| 7,257,635 B2 | 8/2007 | Chellis et al. | |
| 7,433,931 B2 | 10/2008 | Richoux | |
| 7,920,282 B2 * | 4/2011 | Coppinger et al. | 358/1.15 |
| 2003/0084044 A1 * | 5/2003 | Simpson et al. | 707/6 |
| 2005/0114861 A1 * | 5/2005 | Mitchell | 718/100 |
| 2005/0193115 A1 * | 9/2005 | Chellis et al. | 709/226 |
| 2006/0288346 A1 * | 12/2006 | Santos et al. | 718/102 |
| 2007/0294697 A1 | 12/2007 | Theimer et al. | |
| 2009/0288090 A1 * | 11/2009 | Ujibashi et al. | 718/103 |

OTHER PUBLICATIONS

Windows, Windows HPC Server 2008, Microsoft, 2008.*
Rich Ciapala, "Develop Turbocharged Apps for Windows Compute Cluster Server", Apr. 2006, (13 pages).
"HP Virtual Resource Pools", Oct. 2009, (8 pages).
David Davis et.al., "VMware ESX Server—Retrieved", Jan. 8, 2009, (3 pages).
Gilad Shainer et.al., "Scheduling Strategies for HPC as a Service (HPCaaS)", 2009, (6 pages).
Moab Cluster Suite, Nov. 23, 2010 (Retrieved Date), (2 pages).

* cited by examiner

*Primary Examiner* — Jeffrey M Rutkowski
*Assistant Examiner* — Hardikkumar Patel
(74) *Attorney, Agent, or Firm* — Workman Nydegger

(57) ABSTRACT

The scheduling of a processing job to be performed by at least a portion of a cluster of processing resources distributed across multiple machines. The processing job is associated with a certain entity having a certain amount of guaranteed processing resources on the cluster. If there are enough processing resources to perform the job, then the job may be initiated. On the other hand, if there are not enough processing resources to perform the job, and there are yet some remaining processing resources that are guaranteed to the certain entity, then one or more other jobs that are associated with other entities are at least partially preempted until there are enough processing resources to perform the processing job.

16 Claims, 3 Drawing Sheets

COMPUTING SCHEDULING USING RESOURCE LEND AND BORROW

BACKGROUND

High performance computing is a term of art in which clusters of servers are used to perform complex processing. Such clusters may even be as large as hundreds or even thousands of servers. Each of such servers may have multiple processing cores. Often, very complex computational jobs may be performed using such clusters. Despite the cluster's ability to perform a large number of processing operations per second, it may perhaps still take a matter of minutes, hours, days, weeks, or even months to solve some computational jobs.

Oftentimes, a cluster is not dedicated to a single computational job at any given moment. Rather, clusters may perform multiple jobs simultaneously with some processing resources (e.g., a server or processor core set) being used for one job, and other processing resources (e.g., another server or processor core set) being used for another job, and so forth for perhaps yet other jobs. Different entities may even request that a particular set of processing resources perform processing jobs.

BRIEF SUMMARY

At least one embodiment described herein relates to the scheduling of a processing job to be performed by at least a portion of a cluster of processing resources distributed across multiple machines. The processing job is associated with a certain entity having a certain amount of guaranteed processing resources on the cluster. If there are enough processing resources to perform the job, then the job may be initiated. On the other hand, if there are not enough processing resources to perform the job, and there are yet some remaining processing resources that are guaranteed to the certain entity, then one or more other jobs that are not associated with the same entity are at least partially preempted at least until there are enough processing resources to perform the processing job. Thus, certain amounts of processing resources may be guaranteed to a certain entity when using a cluster of processing resources. This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the scheduling of a cluster processing job is described. The job is to be performed by at least a portion of a cluster of processing resources distributed across multiple machines. If there are enough processing resources to perform the job, then the job may be initiated. On the other hand, if there are not enough processing resources to perform the job, and there are yet some remaining processing resources that are guaranteed to the certain entity associated with the processing job, then one or more other jobs that are not associated with that entity are at least partially preempted until there are enough processing resources to perform the processing job. First, some introductory discussion regarding computing systems will be described with respect to FIG. 1. Then, the embodiments of the scheduling will be described with respect to FIGS. 2 and 3.

Figure 1:
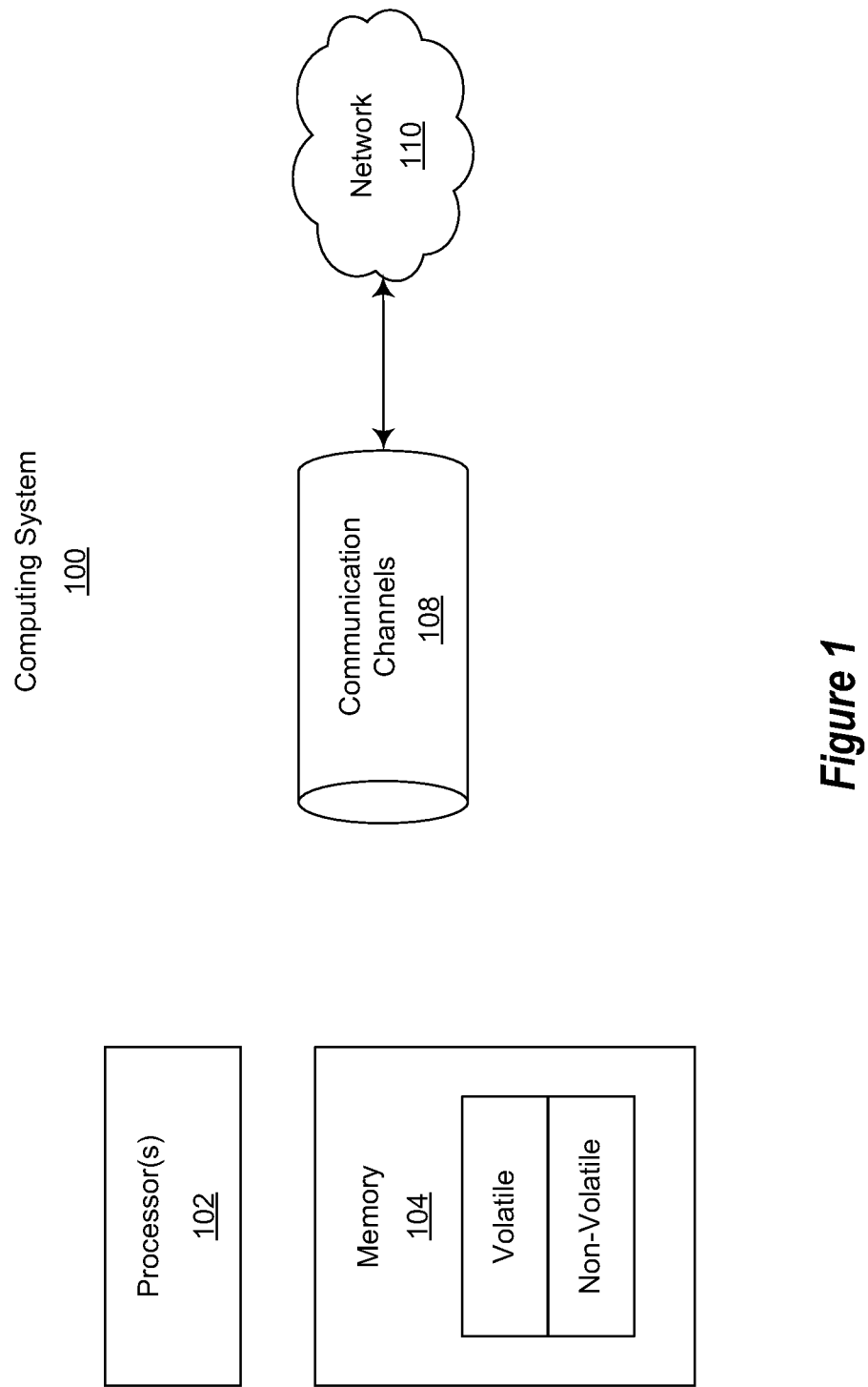
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
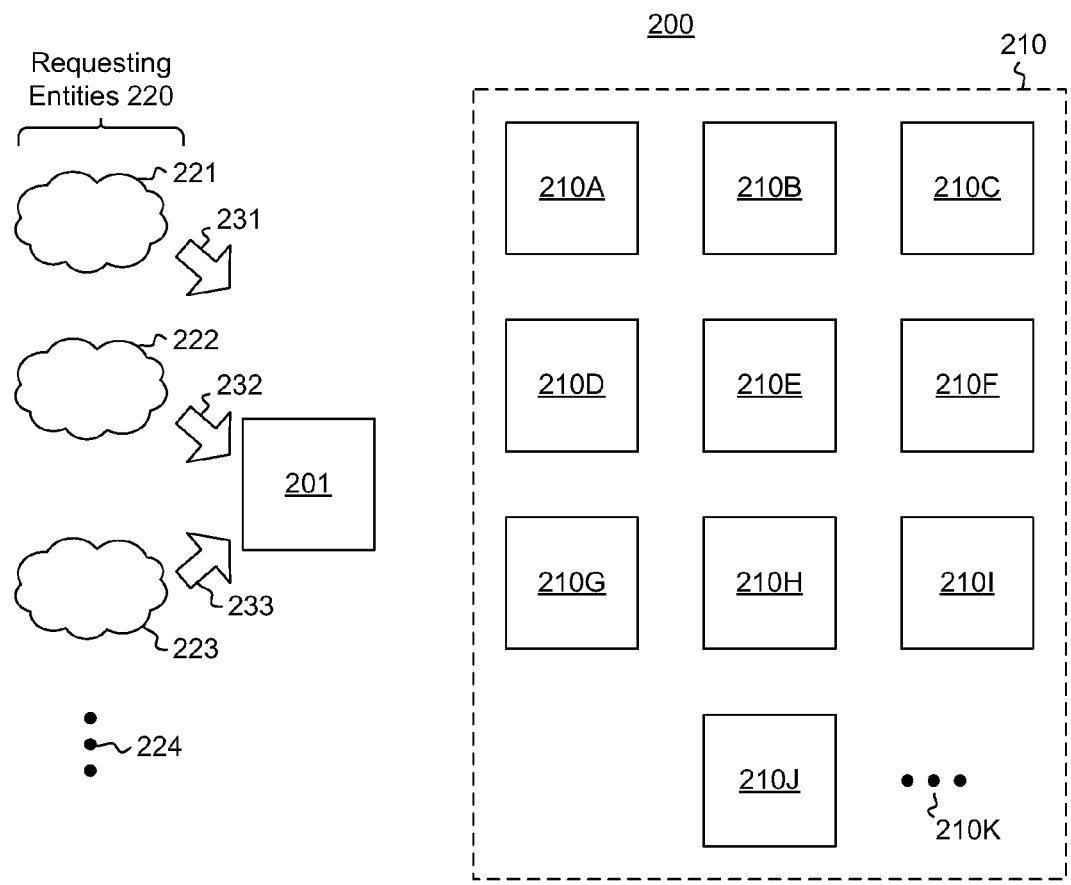
FIG. 2 illustrates an environment that includes a cluster of computing systems that is operating to processing multiple process jobs, and in which the processing jobs are scheduled using a scheduler computing system.

FIG. 2 illustrates a network 200 in which the principles described herein may be practiced. The network 200 includes a cluster 210 of computing systems. In the illustrated embodiment, the cluster 210 is illustrated as including ten computing systems 210A through 210J that are perhaps distributed. However, the ellipses 210K represent symbolically that the number of computing systems in the cluster 210 is not critical. The cluster 210 may contain as few as one computing system, and may contain numerous computing systems, even perhaps numbering in the thousands and higher.

Each computing system may contain one or more processing cores. Processing cores may be grouped into processing resources. For instance, perhaps groups of eight processing cores are categorized as being part of a processing resource, although the principles described herein are not limited to the capabilities or structure of the processing resources, nor are they limited to embodiments in which each processing resource has equal processing capability. Each computing system in the cluster 210 may have even multiple processing resources.

The network 210 also includes a scheduling computing system 201. Optionally, the scheduling computing system 201 may not just perform scheduling of processing jobs that are requested of the cluster, but may also have its own processing resources that may be used as part of the cluster of available processing resources associated with the cluster. The cluster may be, for example, a high performance computing (HPC) cluster involving complex computations. For instance, the processing jobs may take even over a minute, hour, day, or weeks to complete.

The cluster 210 handles processing jobs requested by multiple entities. For instance, in FIG. 2, any one of requesting entities 220 may submit processing jobs to the scheduling computing system 201 so that the scheduling computing system 201 may schedule such processing jobs on the cluster 210. In the illustrated embodiment, the requesting entities 220 include three requesting entities 221, 222 and 223, though the ellipses 224 symbolically represent that there may be any number of entities that may submit processing jobs to the scheduling computing system 220. In one embodiment, however, each requesting entity 220 would either have a contract with the provider of the cluster 210 and/or have partial or full ownership of the cluster 210 to thereby be able to have access to the cluster. A requesting entity may be an organization, company, division, university, research lab, or any other conceivable entity that may have use of extensive computational resources. Though each requesting entity may request numerous processing jobs, the requesting entity 221 is illustrated as submitting processing job 231, the requesting entity 222 is illustrated as submitting processing job 232, and the requesting entity 223 is illustrated as submitting processing job 233.

The scheduling computing system 201 may have access to a structure and/or a computer program product having one or more computer storage media having thereon computer executable instructions, that when executed by one or more processors of a scheduling computing system, cause the scheduling computing system to perform the scheduling.

Figure 3:
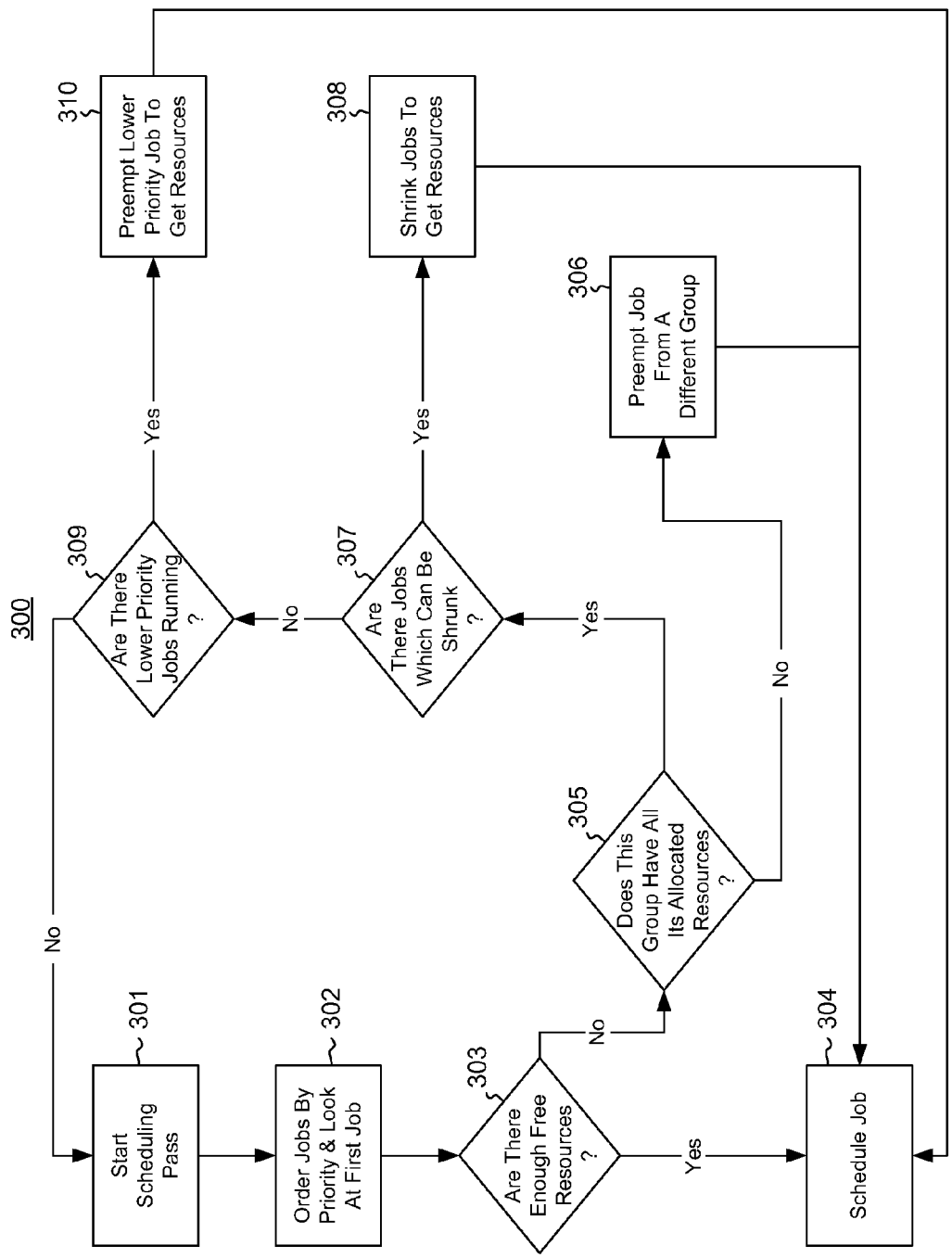
FIG. 3 illustrates a flowchart of a method for scheduling processing jobs to be processed by a cluster of computing systems such as the cluster of FIG. 2.

For instance, FIG. 3 illustrates a flowchart of a computer-implemented method 300 for scheduling a processing job to be performed by all or more likely a portion of a cluster of processing resources. The method 300 of FIG. 3 may be performed by the environment 200 of FIG. 2.

The method 300 is initiated with the assumption that a certain entity has a certain amount of guaranteed processing resources on the cluster of processing resources. For instance, as an example only, suppose that there are 100 processing resources in the cluster 210, and that entity 221 has 20 guaranteed processing resources, entity 222 has 20 guaranteed processing resources, and that entity 223 has 20 guaranteed processing resources. This guaranty is not a guaranty of which 20 processing resources the entity will have—just that the entity will have some 20 processing resources if requested.

The method 300 initiates a processing pass (act 301) to determine which processing job should be considered next for processing, and whether the cluster is ready for the processing job. First, the processing jobs are sorted by priority (act 302), with higher priority jobs moving to the front of the queue. For processing jobs of the same priority, the order of arrival in the queue may take precedence next in the queue order. The processing job that is first in the queue (hereinafter, the "subject processing job") is then evaluated for this processing pass. The remainder of the method 300 determines whether to initiate the subject processing job with the cluster, and if so, what preparations, if any, are needed in the cluster to accommodate the subject processing job.

The method 300 then determines whether there are enough processing resources on the cluster of processing resources to perform the subject processing job (decision block 303). If there are enough processing resources to perform the subject processing job (Yes in decision block 303), the scheduling computing system provides appropriate commands to initiate the subject processing job on the cluster (act 304). In this case, no other processing jobs needed to be preempted or shrunk before initiating the subject processing job. For instance, in the example above, suppose the subject processing job is associated with entity 221 and would need 5 processing resources to execute, and that entity 221 already was utilizing 25 processing resources. Now suppose that 65 other processing resources were utilized by other entities. In this condition, there are 10 unutilized processing resources. Thus, there are enough available processing resources to handle the subject processing job, which only requires 5 processing resources. Thus, the subject processing job would be initiated immediately under this scenario as applied to the example.

On the other hand, if there had not been enough processing resources to perform the subject processing job (No in decision block 303), then the analysis would proceed to a determination of whether the certain entity has remaining guaranteed processing resources (decision block 305). If there are remaining guaranteed resources for that entity (Yes in decision block 305), then one or more other processing jobs associated with other entities are at least partially preempted (act 306) until there are enough processing resources left for the subject processing job to claim guaranteed processing resources associated with the entity.

In one embodiment, such one or more processing jobs may be preempted entirely leaving no processing resources for the job, rather than just being shrunk, and allowed to continue with a reduced amount of processing jobs. Preemption involves perhaps saving state associated with the processing job to be preempted, and putting the preempted processing job back into the queue. When the processing job is resumed upon a subsequent performance of the method 300 for a future processing pass, the processing state may be acquired, whereupon the formerly preempted processing job may continue.

For instance, suppose that the entity 221 was utilizing 10 processing resources in the cluster, and that other entities were utilizing 90 processing resources, thereby utilizing all of the 100 total processing resources. In that case, there is not enough available resources to perform a subject processing job that is to use 5 processing resource (No in decision block 303). Since there are 10 remaining guaranteed processing resources allocated to the entity A (with there being 20 total guaranteed processing resources) (Yes in decision block 305), one or more other processing resources may be freed up by preempting processing jobs associated with other entities.

The preempted processing job would not be a processing job that is being performed by the guaranteed processing resources of another entity. Rather, the preempted processing job would either be a processing job performed for an entity that did not have any guaranteed processing resources, or which was performed by processing resources that were beyond the guaranteed processing resources for the entity associate with the processing job. The decision of which of the one or more processing resources to preempt may be made in accordance with any business logic. For instance, perhaps the lowest priority of the non-guaranteed processing jobs is preempted.

If the scheduling computing system determines that there are not enough processing resources to perform the subject processing job (No in decision block 303), and also that there are not further resources in the guaranteed amount of processing resources associated with the requesting entity (No in decision block 305), then it is determined whether one or more other processing jobs can be shrunk such that the guaranteed processing resources of other entities are not infringed, and such that there would be sufficient resources to perform the subject processing job (decision block 307).

If there are such shrinkable processing jobs (Yes in decision block 307), then the shrinkable processing jobs are shrunk (act 308), and the subject processing job is initiated (act 304). In this description and in the claims, "shrinking" a processing job involves reducing the number of processing resources that are used to process the job, but still allowing the shrunk processing job to continue processing at some level. If there are not such shrinkable processing jobs (No in decision block 307), it is then determined whether one or more processing jobs can be preempted such that the guaranteed processing resources of other entities are not infringed, and such that there would be sufficient resources to perform the subject processing job (decision block 309).

If there are such preemptable jobs (Yes in decision block 309), then the preemptable processing jobs are preempted (act 310), and the current processing job is initiated (act 304). Otherwise, if there are no such preemptable jobs (No in decision block 309), then the cluster is simply not ready to process the subject processing job, and thus the subject processing job is placed back into the queue and is evaluated along with all the other processing jobs in the queue in the next scheduling pass. That re-inserted processing job may be selected in the next scheduling pass, but it is entirely feasible that a higher priority job inserted into the queue in the meantime will cause the re-inserted processing job to have to wait a number of scheduling passes before it is once again selected for a scheduling pass.

Accordingly, the principles described herein present a balanced scheduling mechanism that permits the priority of a processing job to be considered, while still allowing certain entities to have assurance of the availability of guaranteed processing resources. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more hardware storage devices having stored thereon computer executable instructions, that when executed by one or more processors of a computing system, causes the computing system to perform the following:
   an act of registering a plurality of entities to a cluster of processing resources, including registering at least a first entity as having a first corresponding amount of guaranteed processing resources on the cluster of processing resources and registering at least a second entity as having a second corresponding amount of guaranteed processing resources on the cluster of processing resources;
   an act of identifying a processing job for the cluster of processing resources, the processing job being associated with the first entity, the processing job requiring an amount of processing resources that is less than or equal to the first corresponding amount of guaranteed processing resources associated with the first entity;
   an act of determining whether there are enough processing resources remaining on the cluster of processing resources to perform the processing job;
   an act of determining whether the first entity has sufficient guaranteed processing resources to process the processing job without exceeding the first corresponding amount of guaranteed processing resources associated with the first entity; and
   when there are not enough processing resources remaining on the cluster of processing resources to perform the processing job, and when it is determined that the first entity has sufficient guaranteed processing resources to process the processing job without exceeding the first corresponding amount of guaranteed processing resources associated with the first entity, performing the following:
      an act of determining that the second entity is exceeding the second corresponding amount of guaranteed processing resources associated with the second entity; and
      based on the second entity exceeding the second corresponding amount of guaranteed processing resources associated with the second entity, an act of at least partially preempting one or more other processing jobs of the second entity, at least until there are enough processing resources to perform the processing job associated with the first entity.

2. The computer program product in accordance with claim 1, wherein the cluster of processing resources are distributed across multiple machines.

3. The computer program product in accordance with claim 1, wherein each of the processing resources comprises a group of one or more processor cores.

4. The computer program product in accordance with claim 1, wherein the computer-executable instructions further are structured, such that if the computing system determines that there are enough processing resources to perform the job, the method further comprises:
   an act of initiating the processing job without performing the act of at least partially preempting one or more other processing jobs.

5. The computer program product in accordance with claim 1, wherein the computer-executable instructions further are structured, such that when the computing system determines that there are not enough processing resources remaining on the cluster of processing resources to perform the processing job, and when it is determined that the first entity has insufficient guaranteed processing resources to process the processing job without exceeding the first corresponding amount of guaranteed processing resources associated with the first entity, the method further comprises:
   an act of determining to at least partially preempt one or more other processing jobs of the second entity anyway, despite there being no further resources in the first corresponding amount of guaranteed of processing resources associated with the first entity.

6. The computer program product in accordance with claim 5, wherein the act of determining to at least partially preempt one or more other processing jobs of the second entity anyway comprises:
   an act of determining to shrink one or more other processing jobs of the second entity.

7. The computer program product in accordance with claim 5, wherein the act of determining to at least partially preempt one or more other processing jobs of the second entity anyway comprises:
   an act of determining to preempt one or more other processing jobs of the second entity.

8. The computer program product in accordance with claim 5, wherein the act of determining to at least partially preempt one or more other processing jobs of the second entity anyway comprises:
   an act of determining whether to shrink one or more other processing jobs; and
   after determining that one or more other processing jobs should not be shrunk, an act of determining whether to preempt one or more other processing jobs.

9. The computer program product in accordance with claim 1, wherein the processing job takes at least one minute.

10. A computer-implemented method for scheduling a processing job to be performed by at least a portion of a cluster of processing resources, the method comprising:
    at one or more processors of a scheduling computer system, an act of registering a plurality of entities to the cluster of processing resources, including registering at least a first entity as having a first corresponding amount of guaranteed processing resources on the cluster of processing resources and registering at least a second entity as having a second corresponding amount of guaranteed processing resources on the cluster of processing resources;
    at the one or more processors of the scheduling computer system, an act of identifying the processing job for the cluster of processing resources, the processing job being associated with the first entity, the processing job requiring an amount of processing resources that is less than or equal to the first corresponding amount of guaranteed processing resources associated with the first entity
    at the one or more processors of the scheduling computer system, an act of determining whether there are enough processing resources remaining on the cluster of processing resources to perform the processing job;
    at the one or more processors of the scheduling computer system, an act of determining whether the first entity has sufficient guaranteed processing resources to process the processing job without exceeding the first corresponding amount of guaranteed processing resources associated with the first entity; and when there are not enough processing resources remaining on the cluster of processing resources to perform the processing job, and when it is determined that the first entity has sufficient guaranteed processing resources to process the processing job without exceeding the first corresponding amount of guaranteed processing resources associated with the first entity, performing the following:

an act of determining that the second entity is exceeding the second corresponding amount of guaranteed processing resources associated with the second entity; and based on the second entity exceeding the second corresponding amount of guaranteed processing resources associated with the second entity, an act of at least partially preempting one or more other processing jobs of the second entity, at least until there are enough processing resources to perform the processing job associated with the first entity.

11. The method in accordance with claim 10, wherein each of the processing resources comprises a group of one or more processor cores.

12. The method in accordance with claim 10, wherein when it is determined that there are sufficient guaranteed processing resources to perform the job, the method further comprises:

an act of initiating the processing job without performing the act of at least partially preempting one or more other processing jobs.

13. The method in accordance with claim 10, wherein when it is determined that there are not enough processing resources remaining on the cluster of processing resources to perform the processing job, and when it is determined that the first entity has insufficient guaranteed processing resources to process the processing job without exceeding the first corresponding amount of guaranteed processing resources associated with the first entity, the method further comprises:

an act of determining to at least partially preempt one or more other processing jobs of the second entity anyway, despite there being no further resources in the first corresponding amount of guaranteed of processing resources associated with the first entity.

14. The method in accordance with claim 13, wherein the act of determining to at least partially preempt one or more other processing jobs of the second entity anyway comprises:

an act of determining to shrink one or more other processing jobs of the second entity.

15. The method in accordance with claim 13, wherein the act of determining to at least partially preempt one or more other processing jobs of the second entity anyway comprises:

an act of determining to preempt one or more other processing jobs of the second entity.

16. A network comprising:

a plurality of cluster computing system that collectively provide a cluster of processing resources;

a scheduling computing system including a computer program product comprising one or more computer storage media having stored thereon computer executable instructions, that when executed by one or more processors of the scheduling computing system, causes the scheduling computing system to perform the following:

an act of registering a plurality of entities to a cluster of processing resources, including registering at least a first entity as having a first corresponding amount of guaranteed processing resources on the cluster of processing resources and registering at least a second entity as having a second corresponding amount of guaranteed processing resources on the cluster of processing resources;

an act of identifying a processing job for the cluster of processing resources, the processing job being associated with the first entity, the processing job requiring an amount of processing resources that is less than or equal to the first corresponding amount of guaranteed processing resources associated with the first entity;

an act of determining whether there are enough processing resources remaining on the cluster of processing resources to perform the processing job;

an act of determining whether the first entity has sufficient guaranteed processing resources to process the processing job without exceeding the first corresponding amount of guaranteed processing resources associated with the first entity;

when there are not enough processing resources remaining on the cluster of processing resources to perform the processing job, and when it is determined that the first entity has sufficient guaranteed processing resources to process the processing job without exceeding the first corresponding amount of guaranteed processing resources associated with the first entity, performing the following:

an act of determining that the second entity is exceeding the second corresponding amount of guaranteed processing resources associated with the second entity;

based on the second entity exceeding the second corresponding amount of guaranteed processing resources associated with the second entity, an act of preempting one or more other processing jobs of the second entity, at least until there are enough processing resources to perform the processing job associated with the first entity; and an act of initiating the processing job after the act of preempting one or more other processing jobs of the second entity.

\* \* \* \* \*